United States Patent [19]

Oman et al.

[11] Patent Number: 4,579,136
[45] Date of Patent: Apr. 1, 1986

[54] SHEAR VALVE

[75] Inventors: W. Steele Oman, Reseda; Richard D. Scott, Northridge; Blaise Revay, San Marino, all of Calif.

[73] Assignee: HR Textron Inc., Valencia, Calif.

[21] Appl. No.: 405,627

[22] Filed: Aug. 5, 1982

[51] Int. Cl.[4] .............................................. F16K 17/14
[52] U.S. Cl. .................................. 137/68.2; 137/627.5
[58] Field of Search .................. 137/68 A, 68 R, 627.5

[56] References Cited

U.S. PATENT DOCUMENTS

| | | |
|---|---|---|
| 2,777,455 | 1/1957 | Daudelin ........................ 137/68 A |
| 3,464,633 | 9/1969 | Potocnik ........................ 137/68 R X |
| 3,548,848 | 12/1970 | Stichling ........................ 137/68 A |
| 3,638,669 | 2/1972 | Feight ........................ 137/68 A |
| 3,897,799 | 8/1975 | Lee ........................ 137/68 A |

Primary Examiner—Harold W. Weakley
Attorney, Agent, or Firm—Nilsson, Robbins, Dalgarn, Berliner, Carson & Wurst

[57] ABSTRACT

A shear valve which controls the flow of a fluid from one of two different sources to a using apparatus upon application of pressure to a piston which severs the shear sections of the valve. One of the two sources of fluid may be self-contained as an integral part of the shear valve.

21 Claims, 4 Drawing Figures

SHEAR VALVE

BACKGROUND OF THE INVENTION

1. Field of the Invention

This invention relates generally to fluid flow control valves and more particularly to improvements in shear valves.

2. The Prior Art

Shear valves of various types are well known in the prior art. Generally such valves are adapted to provide fast operating valves for control of fluid from a source to a desired using apparatus or load upon activation of an explosive squib or high pressure gas source. In some instances, such shear valves are used to control the flow of two or more fluids which are to be mixed at the load such as in a bipropellant rocket engine or the like. Other examples for the use of such valves is in the control of cryogenic fluids such as liquid hydrogen or oxygen or in aircraft fire extinguishers. In all cases the valves must be leak-proof at least with respect to one source of fluid and must also have the capability to open a desired flow path within milliseconds. The most pertinent prior art known to aplicants are the following U.S. Pat. Nos. 3,464,633, 3,478,706, 3,141,470, 3,412,743, 3,111,133, 3,473,543, 2,997,051.

SUMMARY OF THE INVENTION

A shear valve for switching the flow of fluid from one source to another including a body having first and second supply ports, one port connected to each supply source and an exhaust port connected to a using apparatus. A shear member is affixed to the body and normally blocks flow of fluid from one of the sources to the other.

DETAILED DESCRIPTION OF THE PREFERRED EMBODIMENTS

Figure 1:
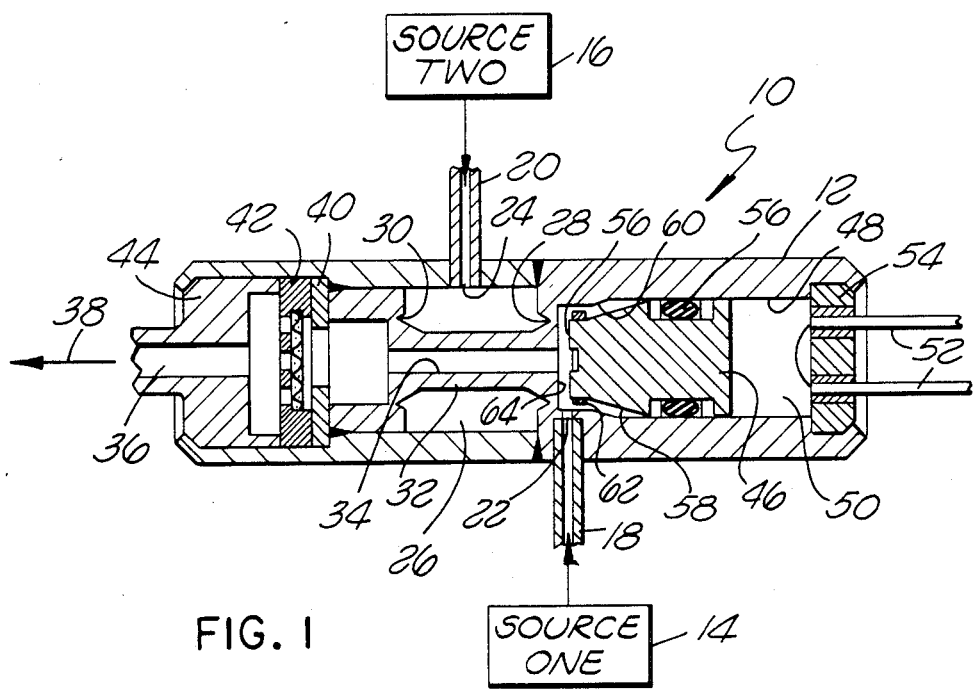
FIG. 1 is a longitudinal view in cross section of a preferred embodiment of the valve of the present invention illustrated in its non-operated position.
Figure 2:
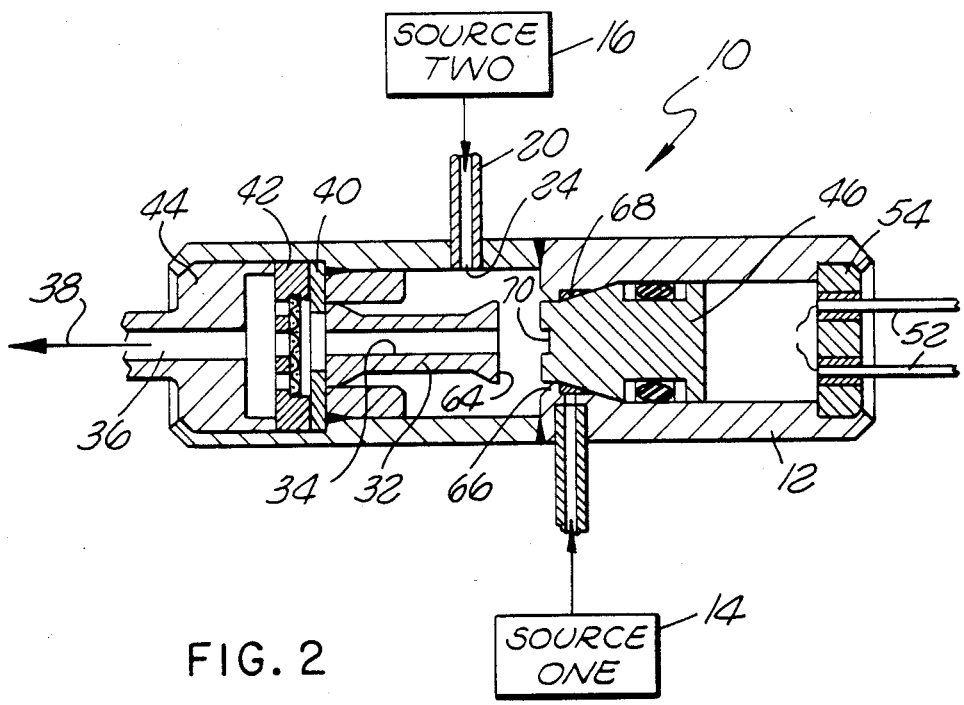
FIG. 2 is a similar view of the valve of FIG. 1 but shown in operated position.

A shear valve constructed in accordance with the present invention is illustrated in the drawings and a preferred embodiment is illustrated in FIGS. 1 and 2 to which reference is hereby made. The valve shown in FIGS. 1 and 2 generally connects one source of fluid such as gaseous helium through the valve to a using apparatus such as a cryostat to maintain a desired temperature at the using apparatus. An alternative source of fluid is sealed by the valve from the using apparatus. However, upon activation of the valve the flow of fluid is switched from the first source to the second source while not interrupting the fluid flow insofar as the using apparatus is concerned.

As is shown particularly in FIGS. 1 and 2, the shear valve 10 of the present invention includes a body member 12 to which there is connected a source one 14 and a source two 16 of fluid. Source one may, for example, be a pressurized fluid container on the ship carrying a self-propelled vehicle which incorporates the cryostat. Source two may be carried by the vehicle and is used only when the vehicle leaves the ship. The source 14 is connected to the body by a passageway 18 while the source 16 is connected to the body by a passageway 20, each of which, respectively, is connected to supply ports 22 and 24. The supply port 24 communicates with a chamber 26 which is defined by the body 12 as well as shear sections 28 and 30 formed by a shear member 32 which, it will be noted, is formed as an integral part of the body 12. The shear member 32 defines a bore 34 therethrough which communicates between one of the supply ports 22 or 24 and an exhaust port 36 which is connected to the using apparatus so as to receive the flow of fluid from the source 14 or 16 as illustrated by the arrow 38. As illustrated in FIG. 1, prior to valve activation, the fluid flows from the source 14 through the passageway 18, port 22, bore 34 and exhaust port 36 as shown by the arrow 38.

A seat member 40 and a filter assembly 42 are disposed within one end of the housing 12 and are secured in place by the end fitting 44 which defines the exhaust port 36. As is noted the end fitting 44 is held in place by upsetting or crimping the end of the housing 12.

At the opposite end of the housing 12 there is disposed a means for rupturing the shear members 28 and 30. In a preferred form there is provided a piston generally in the form of a stopper 46 which is disposed within the cylinder 48 defined by the internal surface of the housing 12. An explosive cartridge 50 is positioned behind the piston 46. The explosive cartridge 50 is activated by an electrical signal applied to the leads 52 which protrude through appropriate insulators disposed within an end cap 54 which is held in place by crimping the end of the housing 12 as is illustrated.

An appropriate O-ring 56 is provided to maintain a seal between the products of combustion when the explosive cartridge 50 is ignited and the gas flowing to the using apparatus as shown by the arrow 38.

Upon igniting the explosive cartridge 50 the piston 46 travels toward the left as shown in FIG. 2 and the face 56 thereof strikes the shear member 32 thereby rupturing the shear sections 28 and 30 driving the shear member toward the left as viewed in FIG. 2 into engagement with the seat 40.

As shown in FIG. 1 the piston 46 includes a conical surface 58 thereon having a slightly different slope as the surface 60 on the interior wall 48 of the housing 12. The nose or end of the piston 46 carries a malleable metal ring 62 for a purpose to be described below.

Reference is now made more specifically to FIG. 2 which illustrates the shear valve in its operated position. As is therein shown the shear member 32 is seated against the seat 40 with the bore 34 in communication with the port 24. As a result fluid from source 2 shown at 16 flows through the passageway 20 and the port 24 outwardly through the bore 34 and the exhaust 36 to the using apparatus as shown by the arrow 38.

The piston 46 has, as a result of the pressure built up by the explosive cartridge contacted the face 64 of the shear member 34 and driven it to the position shown in FIG. 2. At the same time a shoulder 66 defined by the body 12 captures the ring 62 and compresses it into a space 68 defined between the inner surface of the housing 12 and the conical surface 58 of the piston 46. As noted by reference to FIG. 2 the piston 46 effectively functions as a stopper to plug the opening left when the shear member is driven toward the left as shown in FIG. 2. The malleable metal fills the space 68 and thereby seals source 2 fluid from leakage through the passageway 18 or around the piston 46.

Through utilization of a shear valve as shown in FIGS. 1 and 2 the flow of fluid to the using apparatus may be maintained continuously and switched from a first source 14 to a second source 16 by operation of the shear valve. It should also be noted that a slot or groove 70 is provided in the face of the piston 46 so that continuous flow of fluid to the using apparatus is ensured even during the moment of impact between the base 56 and the end 64 at the instant when rupture of the shear sections 28 and 30 occurs.

Figure 3:
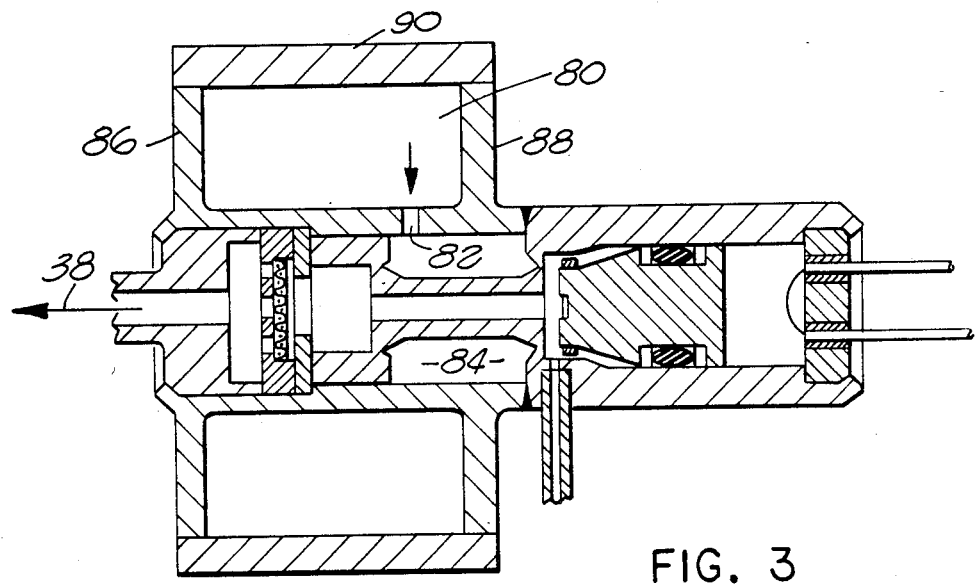
FIG. 3 is a longitudinal sectional view taken in cross section of an alternative embodiment of a valve constructed in accordance with the present invention wherein the second source of the fluid is self-contained as an integral part of the valve.

In some instances it is desired to provide the second source of fluid as a self-contained source which is an integral part of the valve. Such a structure is shown in FIG. 3 to which reference is hereby made. FIG. 3 illustrates the valve as shown in FIGS. 1 and 2 but with the addition of a chamber 80 within which gas under pressure is stored and maintained through the positive seals provided by the shear sections 28 and 30 until such a time as the shear sections are severed as above described. As is illustrated in FIG. 3, the gas contained within the cavity 80 communicates through a port 82 with the sealed chamber 84 until such time as the explosive cartridge is activated. After such activation, the fluid in the chamber 80 passes outwardly as shown by the arrow 38 to the using apparatus. The chamber 80 is formed as illustrated by forming on the housing a pair of opposed walls 86 and 88 to form a U-shaped cavity which is sealed by an annular cap 90 as by welding or the like. Appropriate filling mechanisms such as a tube would be provided so that the cavity 80 could be charged with gas under pressure at the time the valve is constructed.

Figure 4:
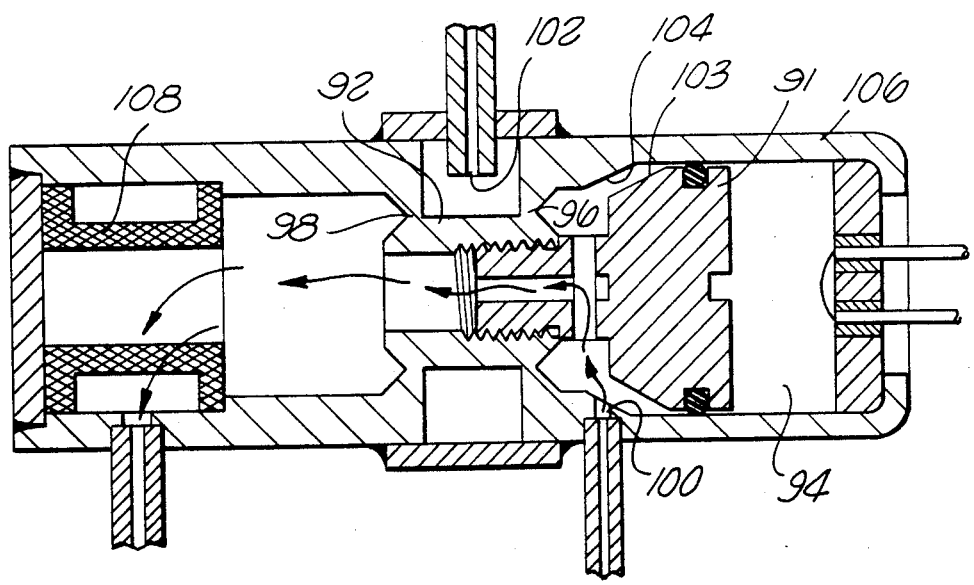
FIG. 4 is a longitudinal cross sectional view of an alternative embodiment of a valve constructed in accordance with the present invention.

Reference is now made to FIG. 4 wherein an alternative embodiment of a shear valve constructed in accordance with the principals of the present invention is illustrated. This valve is substantially the same as that illustrated in FIGS. 1 and 2 and decribed above with the exception of the means for rupturing the shear members. As is shown in FIG. 4 the means for rupturing includes a piston 91 which is formed as a portion of the shear member 92 and may be threaded therein or formed as an integral portion thereof. Upon activation of the explosive cartridge 94 pressure builds up and urges the piston 91 toward the left with sufficient force to rupture the shear sectons 96 and 98 thus transferring flow of fluid from the first inlet port 100 to the second inlet port 102. At the same time port 100 is sealed by the metal-to-metal seal provided by the conical surface 103 on the forward face of the piston 91 and the mating surface 104 provided on the inner surface of the housing 106 (difference in angle provides locking as well as sealing feature).

It will be obvious to those skilled in the art that the filter 42 and shown in FIGS. 1 and 2 as well as the filter 108 shown in FIG. 4 is utilized to trap any particles which may have been generated at the time the shear occurred releasing gas from the second source and blocking gas from the first source.

What is claimed is:

1. A switching valve comprising:
   (a) body means defining first and second supply ports for connection to separate sources of fluid under pressure and an exhaust port for connection to a using apparatus;
   (b) means connecting said first supply port to said exhaust port for supplying fluid from one source thereof to said using apparatus;
   (c) a shear member affixed to said body and normally blocking the flow of fluid through said second port to said exhaust port from the other source thereof when said first port and said exhaust port are interconnected;
   (d) means for rupturing said shear member and separating it from said body to place said second supply port and said exhaust port in communication with each other; and
   (e) means for sealing said first supply port substantially simultaneously with the rupturing of said shear member.

2. The switching valve as defined in claim 1 wherein said means for rupturing includes a sealed cavity and means for pressurizing said cavity.

3. The switching valve as defined in claim 2 wherein said means for pressurizing includes an explosive charge and means for igniting said charge.

4. The switching valve as defined in claim 3 wherein said means for rupturing further includes movable stopper means disposed within said cavity for applying force to said shear member upon ignition of said explosive charge to rupture said shear member.

5. The switching valve as defined in claim 4 wherein said movable stopper includes a contact area spaced apart from said shear member for applying force to said shear member by impact thereagainst upon ignition of said explosive charge.

6. The switching valve as defined in claim 5 wherein said means for sealing includes first and second mating surfaces defined by said body and said stopper means respectively which are placed in mating engagement by ignition of said explosive charge.

7. The switching valve as defined in claim 4 wherein said means for sealing includes a malleable metal member disposed for capture between said stopper means and said body.

8. The switching valve as defined in claim 7 wherein said malleable member is a ring carried by said stopper means.

9. The switching valve as defined in claim 8 wherein said body defines a shoulder for contacting said ring and squeezing said ring between said body and said stopper means to effect said seal.

10. The stitching valve as defined in claim 9 wherein there is defined a space between said body and said stopper means after said means has applied force to said shear member, said space being filled with said malleable ring.

11. The switching valve as defined in claim 4 wherein said stopper means includes a face for contacting said shear member, said face defining a slot therein to ensure the continuous flow of fluid.

12. The switching valve as defined in claim 1 wherein said shear member is an integral part of said body means.

13. The switching valve as defined in claim 12 wherein said shear member defines a cylindrical bore and said means for rupturing includes a stopper means having a protrusion received within said bore.

14. The switching valve as defined in claim 13 wherein said protrusion defines passageway means for providing communication between said first supply port and said exhaust port.

15. The switching valve as defined in claim 14 wherein said protrusion commences at a shoulder which engages said shear member for rupturing said shear member.

16. The switching valve as defined in claim 15 wherein said body means defines an interior beveled surface through which said first supply port passes and said stopper means defines an exterior beveled surface, said beveled surfaces being in engagement for sealing said first supply port.

17. The switching valve as defined in claim 16 wherein said body means and said stopper means define a cavity, an explosive charge received within said cavity, and means for igniting said charge to apply force to said shear member to rupture the same and to bring said beveled surfaces into sealing engagement.

18. The switching valve as defined in claim 1 which further includes a self-contained source of fluid under pressure connected to said second supply port.

19. The switching valve as defined in claim 18 wherein said self-contained source includes a sealed chamber formed integrally with said body means.

20. The switching valve as defined in claim 19 wherein said chamber surrounds said body means.

21. The switching valve as defined in claim 20 wherein communication between said chamber and said exhaust port is blocked by said shear member prior to ignition of said explosive charge.

* * * * *